(12) United States Patent
Turner et al.

(10) Patent No.: US 8,606,117 B1
(45) Date of Patent: Dec. 10, 2013

(54) SYSTEMS AND METHODS FOR UNOBTRUSIVELY TESTING OPTICAL FIBERS

(75) Inventors: Michael D. Turner, Huntsville, AL (US); Leif J. Sandstrom, Madison, AL (US); John Gordon Brooks, Madison, AL (US); Kevin W. Schneider, Huntsville, AL (US); Daniel M. Joffe, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 541 days.

(21) Appl. No.: 12/783,999

(22) Filed: May 20, 2010

(51) Int. Cl.
*H04B 10/04* (2011.01)
(52) U.S. Cl.
USPC ........... 398/195; 298/195; 298/183; 298/141; 298/13; 298/20
(58) Field of Classification Search
USPC ............. 398/195, 140, 202, 153, 154, 77, 78, 398/182, 183, 141, 10, 13, 20
See application file for complete search history.

(56) References Cited

U.S. PATENT DOCUMENTS

| | | | | |
|---|---|---|---|---|
| 4,563,774 | A | * | 1/1986 | Gloge ........................... 398/166 |
| 5,220,580 | A | * | 6/1993 | Heberle et al. ................ 375/142 |
| 5,416,623 | A | * | 5/1995 | Dawson et al. ................. 398/33 |
| 5,825,516 | A | | 10/1998 | Walsh |
| 6,046,797 | A | | 4/2000 | Spencer et al. |
| 6,075,628 | A | * | 6/2000 | Fisher et al. .................... 398/21 |
| 6,122,044 | A | | 9/2000 | Gautheron et al. |
| 6,285,806 | B1 | * | 9/2001 | Kersey et al. .................. 385/12 |
| 7,126,678 | B2 | | 10/2006 | Fayolle et al. |

(Continued)

FOREIGN PATENT DOCUMENTS

| | | |
|---|---|---|
| EP | 1748580 A1 | 7/2005 |
| EP | 1632766 A1 | 3/2006 |

(Continued)

OTHER PUBLICATIONS

Sischka, et al., "Complimentary Correlation Optical Time-Domain Reflectometry—in respect to the HP 8145A Optical Time-Domain Reflectometer—technical," Hewlett-Packard Journal, Dec. 1988, p. 14-21.

(Continued)

*Primary Examiner* — Daniel Washburn
*Assistant Examiner* — Hibret Woldekidan
(74) *Attorney, Agent, or Firm* — Maynard, Cooper & Gale, P.C.; Jon E. Holland

(57) ABSTRACT

A correlation optical time domain reflectometer (OTDR) system embeds an OTDR signal in a digital data signal that is to be converted into an optical signal and transmitted across an optical fiber to a remote receiver. In particular, the digital data signal is amplitude modulated with the OTDR signal, which is based on a pseudo noise (PN) sequence, such as an M-sequence. The amplitude modulation is relatively small, for example, less than about 10% of the digital data signal's peak amplitude in an effort to limit the OTDR signal's effect on communication performance. A sequence recovery element receives reflections from the optical fiber and converts the reflections to digital samples. Each digital sample from the sequence recovery element is correlated by correlators that respectively correspond to delays and, hence, locations along the optical fiber, and accumulators accumulate the correlation values from the correlators. Based on the accumulated values, the correlation OTDR system unobtrusively identifies anomaly locations along the optical fiber while payload data is being communicated across the fiber.

27 Claims, 10 Drawing Sheets

(56) References Cited

U.S. PATENT DOCUMENTS

| | | | |
|---|---|---|---|
| 7,274,441 B2 * | 9/2007 | Payton | 356/73.1 |
| 7,280,188 B2 | 10/2007 | Schmuck et al. | |
| 7,317,874 B2 | 1/2008 | Li et al. | |
| 7,440,701 B2 | 10/2008 | Li et al. | |
| 7,450,848 B2 | 11/2008 | Li et al. | |
| 7,493,042 B2 | 2/2009 | Li et al. | |
| 7,593,494 B1 * | 9/2009 | Ghobrial et al. | 375/350 |
| 2002/0161539 A1 * | 10/2002 | Jones et al. | 702/79 |
| 2004/0044489 A1 * | 3/2004 | Jones et al. | 702/79 |
| 2004/0141499 A1 * | 7/2004 | Kashima et al. | 370/380 |
| 2005/0058460 A1 * | 3/2005 | Wang | 398/195 |
| 2006/0133461 A1 * | 6/2006 | Sleewaegen | 375/150 |
| 2007/0053448 A1 * | 3/2007 | Schwoerer et al. | 375/260 |
| 2007/0211793 A1 * | 9/2007 | Han | 375/150 |
| 2007/0258530 A1 * | 11/2007 | Kim et al. | 375/260 |
| 2009/0257743 A1 | 10/2009 | Chung et al. | |
| 2010/0168586 A1 * | 7/2010 | Hillman et al. | 600/476 |
| 2012/0002959 A1 * | 1/2012 | Melamed | 398/10 |

FOREIGN PATENT DOCUMENTS

| | | |
|---|---|---|
| EP | 1884758 A1 | 3/2006 |
| EP | 1901448 A1 | 9/2006 |
| EP | 1986350 A1 | 4/2007 |
| EP | 1524781 B1 | 10/2007 |
| EP | 1675280 B1 | 11/2007 |

OTHER PUBLICATIONS

Takushima, et al. "In-Service OTDR for Passive Optical Networks," OSA/OFC/NFOEC, 2010.

* cited by examiner

SYSTEMS AND METHODS FOR UNOBTRUSIVELY TESTING OPTICAL FIBERS

RELATED ART

In fiber-optic communication systems, optical signals are used to carry data sometimes across great distances. It is well known that optical signals typically provide significantly higher data rates than those enabled by electrical signals. However, anomalies along an optical fiber, such as degraded splices, can adversely affect the performance of optical communication. Thus, techniques have been developed to locate fiber anomalies so that the anomalies can be repaired in order to improve communication performance.

In particular, optical time domain reflectometers (OTDRs) for detecting optical fiber anomalies have been developed and successfully used. One type of OTDR transmits a pulse along an optical fiber. A portion of the light of the pulse is returned toward the transmitter from each point along the optical fiber. As will be well known to those skilled in the art, such returns are produced by scattering of the light (Rayleigh backscatter) all along length of the fiber and in some cases by localized reflections (Fresnel reflections) at particular points along the fiber. Herein, both these sorts of optical signal returns are collectively referred to as reflections. At an anomaly, such as a degraded splice, more attenuation may occur as light passes through the splice, and in some cases more light may be reflected at this point than at other points that are free of anomalies. The OTDR measures the light returned from points along the length of the fiber and detects anomalies based on the retrieved light.

Further, the OTDR can also estimate the location of the detected anomaly based on reflection delay. In this regard, each point along the optical fiber corresponds to a particular delay measured from the time of transmission by the OTDR. That is, the further the location is from the OTDR, the longer it will take for a transmitted pulse to reach the location, reflect, and return to the OTDR. Thus, the OTDR measures the amount of delay between transmission of the pulse and reception of a reflection that may indicate the presence of an anomaly. The delay corresponds to the distance of an anomaly from the OTDR, and the OTDR estimates the distance of the detected anomaly from the OTDR based on such delay.

Unfortunately, there are several significant drawbacks associated with the foregoing OTDR. In particular, data is not transmitted across the optical fiber during testing. Thus, continuous monitoring of the optical fiber is not enabled. In addition, a trade-off exists between resolution and range. In this regard, for better resolution, a more narrow pulse is desired. However, the signal is attenuated as it travels along the optical fiber, and the range of the pulse is limited. A wider pulse of any given amplitude has more light energy and, therefore, a longer range but degrades resolution.

In another type of OTDR, often referred to as a correlation OTDR, there is less of a trade-off between resolution and range because in these systems the parameter that controls range can be varied independently from the parameter that affects resolution. In a correlation OTDR, a pseudo noise (PN) sequence is transmitted along the optical fiber instead of a pulse. The PN sequence that reflects from the optical fiber is correlated with a delayed version of the transmitted PN sequence.

In this regard, the reflected PN sequence and delayed PN sequence are input into a bank of correlators for which each correlator corresponds to a discrete delay and, hence, location on the fiber. The delayed PN sequence is stepped through a delay line, and for each step, each correlator correlates (i.e., multiplies and accumulates) a respective value of the delayed PN sequence with the value of the reflected PN sequence currently received from the fiber thereby outputting a correlation value indicating to what degree the two sequences match.

The delay is controlled such that a given correlator receives a value of the delayed PN sequence when a reflection of that value would be received from the fiber location corresponding to the correlator. Accordingly, PN sequence values received from fiber locations with delays that do not correspond to a given correlator vary relative to the values from the delayed PN sequence such that the correlation values are substantially canceled by the accumulation process. However, reflected PN sequence values received from the location with a delay which does correspond to that correlator respectively match the values from the delayed PN sequence such that the correlation values accumulate to a significant number over time.

Therefore, each correlator provides an output indicative of the light reflected from a given point on the fiber and substantially independent of light reflected from other locations along the fiber. If a correlator provides an output value which is significantly different from the value that would be expected for a fiber with no anomaly at that location, then it can be determined that an anomaly likely exists at the fiber location corresponding to the correlator. The distance resolution limit for the correlation OTDR is controlled by the signaling rate used for the PN sequence, while the maximum distance limit that can be analyzed for the fiber is determined by the maximum delay utilized in the correlator bank along with the signal-to-noise ratio and the amount of accumulator averaging used. Thus, anomalies can be detected, but data is not communicated across the optical fiber during testing since the transmission of the PN sequence would interfere with data transmission.

Accordingly, a heretofore unaddressed need exists in the industry for a system that detects anomalies along an optical fiber yet is unobtrusive to the data communication occurring on the fiber. It would be desirable for such a system to be accurate over a long range with a relatively high degree of resolution. It would also be desirable for such a system to produce an alarm quickly in response to a rapid change in the characteristics of the fiber.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for unobtrusively testing optical fibers. In one exemplary embodiment, a correlation optical time domain reflectometer (OTDR) system embeds an OTDR signal in a digital data signal that is to be converted into an optical signal and transmitted across an optical fiber to a remote receiver. In particular, the digital data signal is amplitude modulated with the OTDR signal. The amplitude modulation is relatively small, for example, on the order of about 1 to 10% of the digital data signal's peak amplitude in an effort to limit the OTDR signal's effect on communication performance.

In one exemplary embodiment, the OTDR signal is based on a pseudo noise (PN) sequence, such as an M-sequence. A sequence recovery element receives reflections from the optical fiber and converts the reflections to digital samples. Each digital sample from the sequence recovery element is provided to a bank of correlators respectively corresponding to delays and, hence, locations along the optical fiber. Each correlator correlates (i.e., multiplies and accumulates) delayed values of the PN sequence with the digital samples for an interval precisely equal to one period of the sequence or to some exact integer multiple of the period. An additional bank of accumulators may be used to further accumulate the correlation values provided by the correlators in order to provide more accurate correlation values. Based on the accumulated values, the correlation OTDR system unobtrusively identifies anomaly locations along the optical fiber while payload data is being communicated across the fiber.

Figure 1:
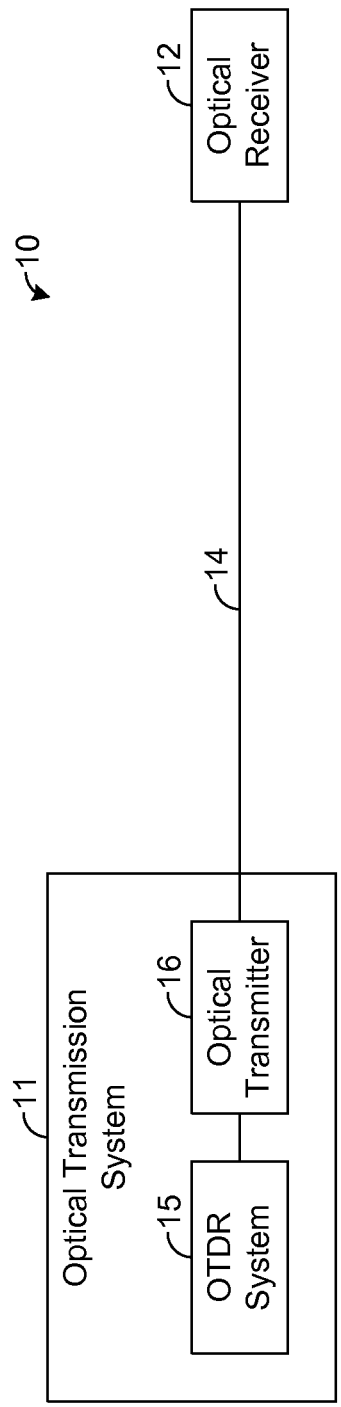
FIG. 1 is a block diagram illustrating an exemplary embodiment of a communication system in which an optical transmission system has an optical time domain reflectometer (OTDR) system for unobtrusively detecting anomalies of an optical fiber while payload data is communicated across the fiber.

FIG. 1 depicts a communication system 10 having an optical transmission system 11 that transmits optical signals to an optical receiver 12 via an optical fiber 14. The transmission system 11 has a correlation OTDR system 15 coupled to an optical transmitter 16. The OTDR system 15 is configured to unobtrusively detect anomalies, such as degraded splices, along the optical fiber 14 while payload data is being communicated across the fiber 14.

Figure 2:
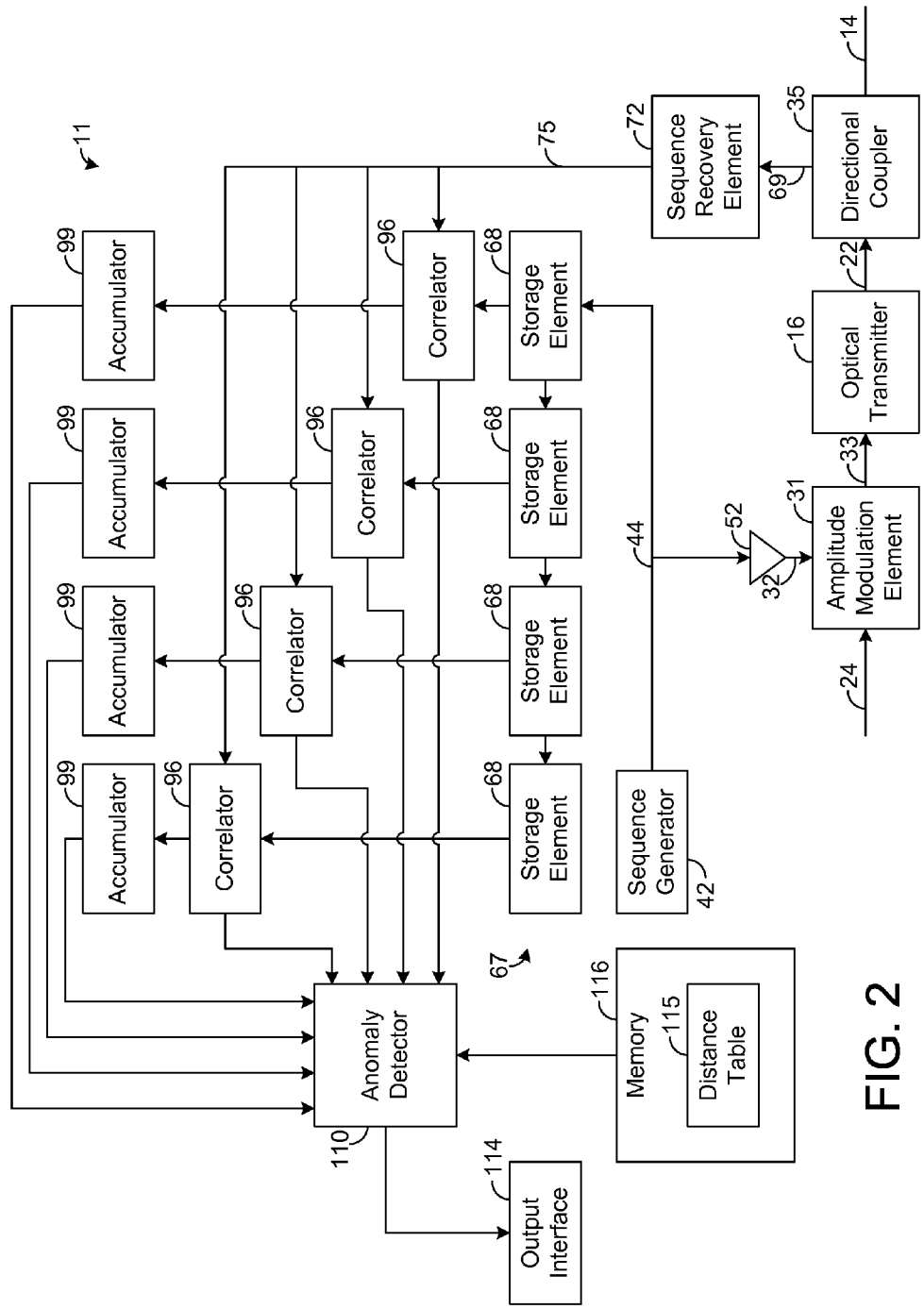
FIG. 2 is a block diagram illustrating an exemplary embodiment of an optical transmission system, such as is depicted by FIG. 1.

FIG. 2 depicts an exemplary embodiment of an optical transmission system 11 incorporating a correlation OTDR. As shown by FIG. 2, the system 11 comprises an optical transmitter 16 that is configured to transmit, across an optical fiber 14, an optical data signal 22 carrying payload data from a received digital data signal 24. In this regard, the optical transmitter 16 is coupled to an amplitude modulation element 31 that is configured to modulate the pulses of the digital data signal 24 with an OTDR signal 32, as will be described in more detail hereafter, to provide an amplitude modulated (AM) data signal 33. The optical transmitter 16 is also coupled to a directional coupler 35 that is coupled to the optical fiber 14, as shown by FIG. 2. The optical transmitter 16 converts the AM data signal 33 to an optical data signal 22 that is transmitted through the directional coupler 35 to the optical fiber 14, which carries the optical signal 22 to the optical receiver 12 (FIG. 1) at a remote location. The optical receiver 12 detects the payload data and further processes the payload data as may be desired.

A sequence generator 42 generates a digital data sequence 44. In one exemplary embodiment, the data sequence 44 is a PN sequence, such as an M-sequence. As known in the art, an M-sequence has correlation properties that generally make this type of sequence preferred for many applications, including anomaly detection. However, other types of digital data sequences, such as a random data sequence, may be used in other embodiments. For illustrative purposes, it will be assumed hereafter that the digital data sequence 44 is a PN sequence and, more specifically, an M-sequence.

An amplifier 52 amplifies values of the PN sequence 44 to a desired level depending on the amplitude of the digital data signal 24, as will be described in more detail below, to provide the OTDR signal 32 that is to be combined with the digital data signal 24 via amplitude modulation. In one exemplary embodiment, the OTDR signal 32 has a frequency which is smaller than that of the digital data signal 24 by a factor of 100 such that groups of 100 adjacent pulses of the digital data signal 24 are modulated by a respective value of the OTDR Signal 32. In a second exemplary embodiment, the OTDR signal 32 has a frequency which is smaller than that of the digital data signal 24 by a factor of 250 such that groups of 250 adjacent pulses of the digital data signal 24 are modulated by a respective value of the OTDR Signal 32. Other relative frequency scaling factors between the digital data signal 24 and the OTDR signal 32 may be used to optimize performance of the OTDR, as will be apparent to one skilled in the art upon reading this disclosure.

Figure 3:
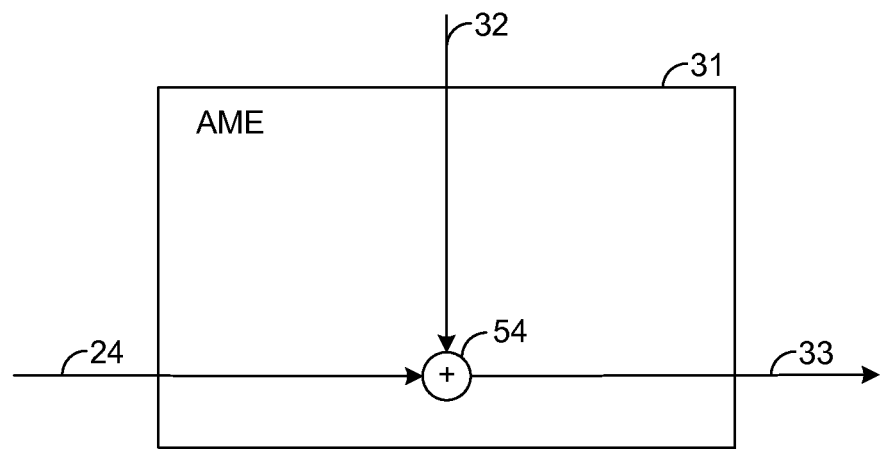
FIG. 3 is a block diagram illustrating an exemplary embodiment of an amplitude modulation element, such as is depicted by FIG. 2.
Figure 4:
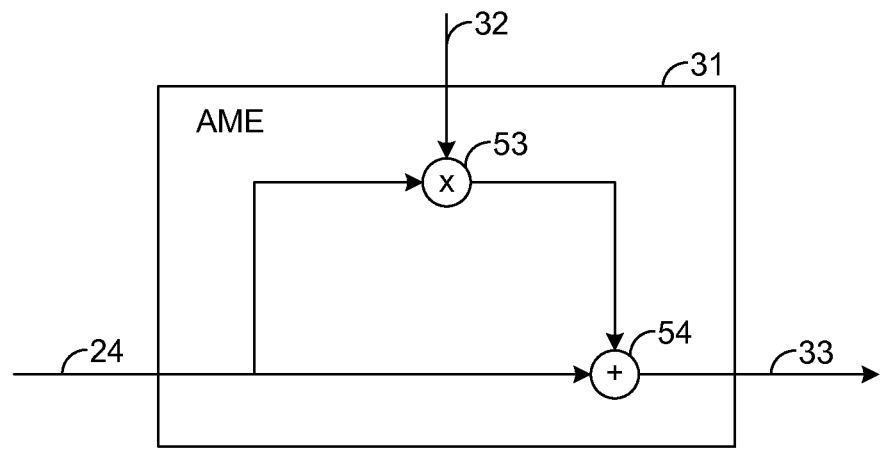
FIG. 4 is a block diagram illustrating another exemplary embodiment of an amplitude modulation element, such as is depicted by FIG. 2.

In one exemplary embodiment, the amplitude modulation element 31 comprises a summer 54, as shown by FIG. 3. The summer 54 sums the OTDR signal 32 with the digital data signal 24 to provide the AM data signal 33. In another exemplary embodiment, the amplitude modulation element 31 comprises a multiplier 53 and a summer 54, as shown by FIG. 4. The multiplier 53 multiplies the OTDR signal 32 by the digital data signal 24, and the summer 54 sums the output of the multiplier 53 with the digital data signal 24 to provide the AM data signal 33. Other structures might also be employed to implement amplitude modulation, as will be apparent to one skilled in the art upon reading this disclosure.

Preferably, modulation performed by the amplitude modulation element 31 affects the amplitude of the digital data signal 24 by a small percentage, such as less than about 10% of the peak amplitude of the digital data signal 24 in an effort to keep interference with the signal 24 low. In this regard, increasing the amplitude of the OTDR signal 32 generally improves the performance of the OTDR measurements but also increases the interference introduced to the digital data signal 24 by the amplitude modulation element 31. In other embodiments, other amplitude percentages are possible. Limiting the modulation such that it affects the amplitude of the data signal 24 by no more than a small amount, such as about 10%, helps to ensure that the optical receiver 12 (FIG. 1) is able to recover the payload data defined by the digital data signal 24.

Figure 5:
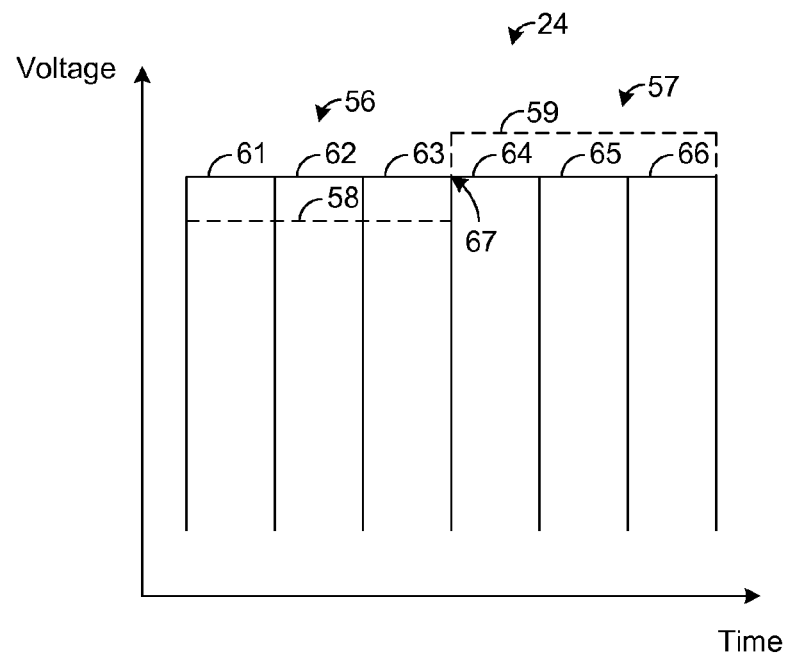
FIG. 5 is a graph illustrating exemplary groups of pulses of a digital data signal, such as is depicted by FIG. 2.

To better illustrate the effect of amplitude modulation on the digital data signal 24, refer to FIG. 5, which depicts two exemplary pulse groups 56, 57 of the digital data signal 24. The group 56 comprises three consecutive pulses 61-63, and the group 57 comprises three consecutive pulses 64-66, which immediately follow the pulses 61-63 of the group 56. For illustrative purposes, each pulse 61-66 is shown as having the same bit value, although it is possible for the bit values of the pulses 61-66 to be different relative to one another. In addition, for illustrative purposes, each group 56, 57 is shown as having three pulses, but the groups 56, 57 may have any number of pulses in other embodiments. Also for illustrative purposes, assume that a transition from a PN sequence value of +1 to a PN sequence value of −1 occurs for the PN sequence 44 at the transition point 67 between the pulses 63 and 64. Thus, each of the pulses 64-66 of the group 57 is combined with the same PN sequence value (+1 in this example), and each of the pulses 61-63 of the group 56 is combined with the same PN sequence value (−1 in this example).

Figure 6:
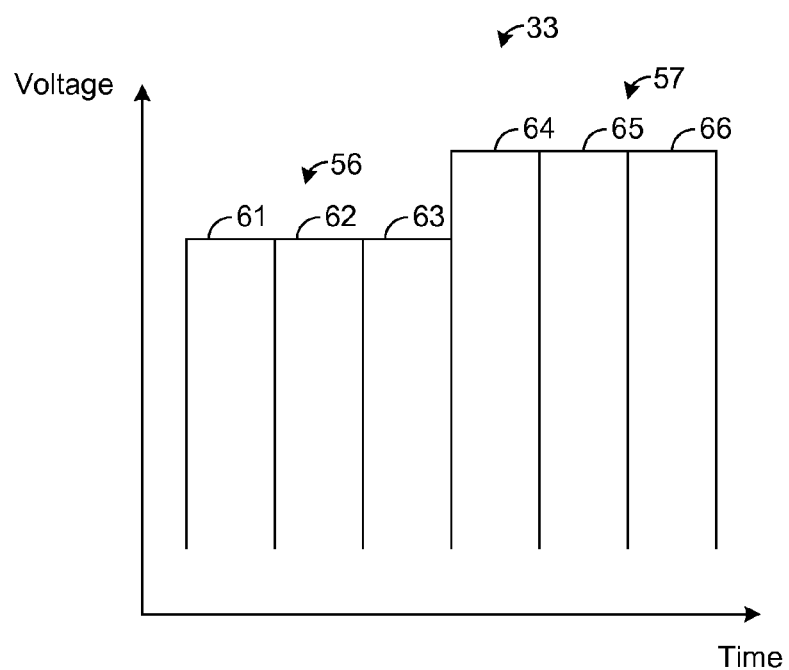
FIG. 6 is graph illustrating the pulse groups of FIG. 5 after amplitude modulation by the amplitude modulation element depicted by FIG. 3 or FIG. 4.

The dotted lines 58, 59 indicate the amplitude levels of the pulses 61-63 and 64-66, respectively, after amplitude modulation by the PN sequence 44. As shown by the dotted lines 58, 59, as well as FIG. 6, which shows the pulse groups 56, 57 after amplitude modulation, the amplitude of each pulse 61-63 is decreased by a small amount by combining a PN value of −1 with such pulses 61-63, and the amplitude of each pulse 64-66 is increased by a small amount by combining a PN value of +1 with such pulses 64-66.

As shown by FIG. 2, the sequence generator 42 is coupled to a delay line 67 through which the PN sequence 44 is serially shifted. In this regard, the delay line 67 has a plurality of storage elements 68, and each storage element 68 stores a respective value (i.e., +1 or −1) of the PN sequence 44 as it is being shifted through the delay line 67.

During transmission, portions of the optical signal 22 reflect back toward the optical transmitter 16 as it travels along the optical fiber 14. The amplitude of the optical signal 22 that is reflected at each location is affected by normal backscattering and by line anomalies, such as degraded splices. The directional coupler 35 receives from the fiber 14 an optical signal 69, referred to hereafter, as the "reflected optical signal," comprising the reflections of the optical signal 22 as it travels along the fiber 14. The directional coupler 35 transmits the reflected optical signal 69 to a sequence recovery element 72, which converts the optical signal reflections to digital samples 75 defining a sequence of digital values. In one exemplary embodiment, the digital samples 75 are serially transmitted at the same frequency as the PN sequence 44.

Figure 7:
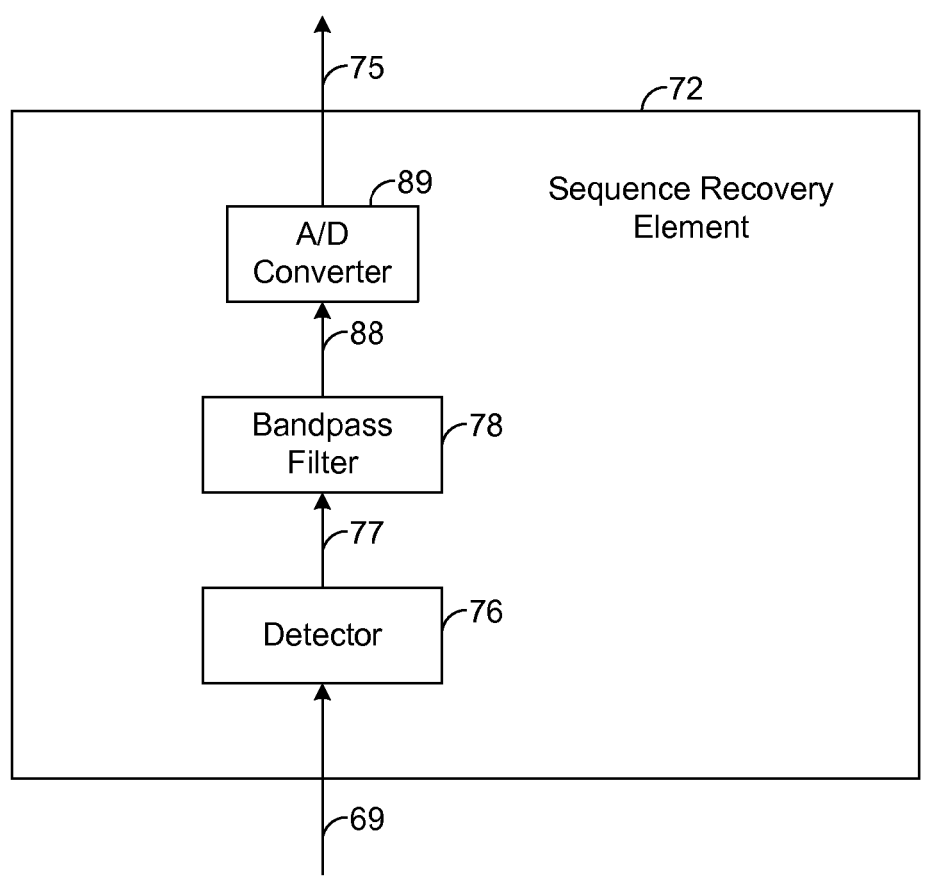
FIG. 7 is a block diagram illustrating an exemplary embodiment of a sequence recovery element, such as is depicted by FIG. 2.

FIG. 7 depicts one exemplary embodiment of the sequence recovery element 72. In this embodiment, the element 72 has a detector 76 that receives the reflected optical signal 69 and converts the optical signal 69 to an analog electrical signal 77. A bandpass filter 78 filters the analog signal 77 in order to substantially remove the high frequency optical modulation associated with the payload data signal 24 and simultaneously remove direct current (DC) offset from the signal, while passing the modulation associated with the PN sequence OTDR signal 44, providing a filtered signal 88 having amplitude appropriate for analog-to-digital conversion. An analog-to-digital (A/D) converter 89 converts the analog signal 88 to digital values. In this regard, the sequence recovery element 72 is configured to output digital values 75, referred to as "samples," and each digital sample 75 is based on reflected signal components that have been reflected from points along the fiber 14. Each such signal component is indicative of the PN sequence value used to modulate its contribution to such sample 75. That is, the digital value 75 represents the sum of reflected signal components that have been reflected at different points along the fiber 14, and each such signal component has been modulated by a respective PN sequence value.

Figure 8:
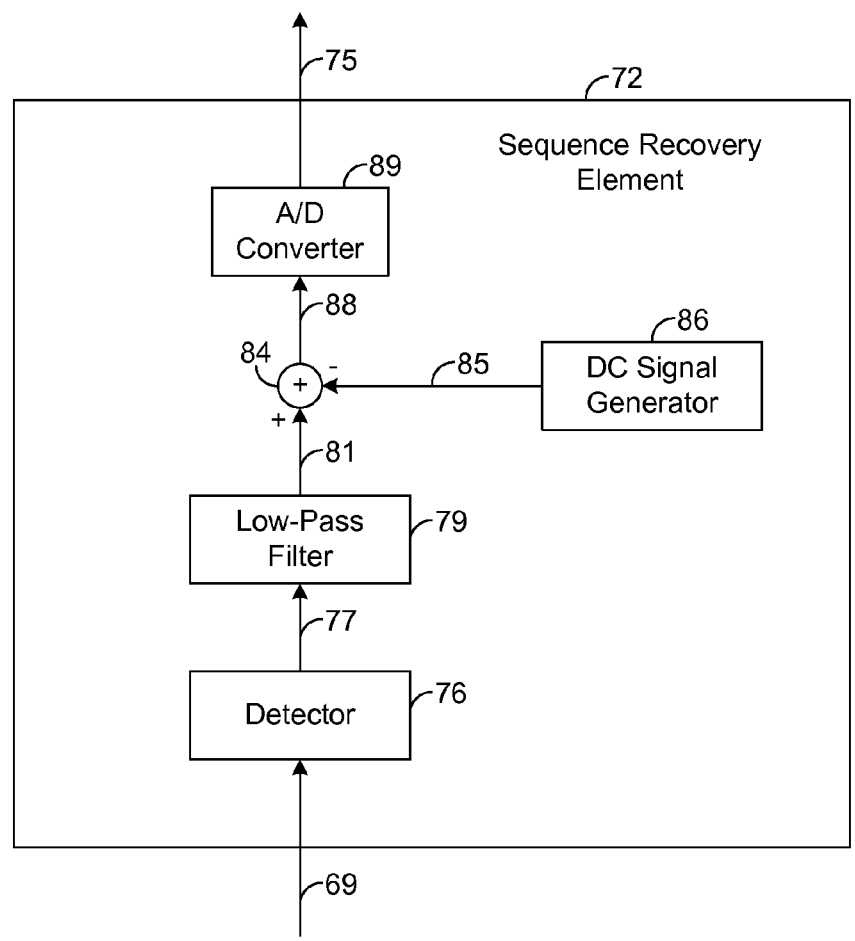
FIG. 8 is a block diagram illustrating another exemplary embodiment of a sequence recovery element, such as is depicted by FIG. 2.

FIG. 8 depicts a second exemplary embodiment of the sequence recovery element 72, which in some cases may provide a more stable mechanism for removing DC offset from the optical signal 69 relative to the embodiment of FIG. 7. In the embodiment of FIG. 8, the element 72 has a detector 76 that receives the reflected optical signal 69 and converts the optical signal 69 to an analog electrical signal 77. A low-pass filter 79 filters the analog signal 77 in order to substantially remove the high speed optical modulation associated with the payload data signal 24, while passing the modulation associated with the PN sequence OTDR signal 44, providing a filtered signal 81. The filtered signal 81 is received by a summer 84, which receives a DC offset signal 85 from a DC signal generator 86, which provides a DC level controlled to substantially match the DC component of the filtered signal 81. The summer 84 subtracts the DC signal 85 from the filtered signal 81 to provide a signal 88 having amplitude appropriate for analog-to-digital conversion. An analog-to-digital (A/D) converter 89 converts the analog signal 88 to digital values. Subtracting the DC offset signal 85 from the filtered signal 81 generally enhances the resolution of the A/D converter 89. The sequence recovery element 72 is configured to output digital samples 75, and each digital sample 75 is based on reflected signal components that have been reflected from points along the fiber. Each such signal component is indicative of the PN sequence value used to modulate its contribution to such sample 75. That is, the digital value 75 represents the sum of reflected signal components that have been reflected at different points along the fiber 14, and each such signal component has been modulated by a respective PN sequence value.

The digital sample 75 recovered by the element 72 is transmitted to a plurality of correlators 96 respectively coupled to the storage elements 68 of the delay line 67, as shown by FIG. 2. Each correlator 96 correlates (i.e., multiplies and accumulates) successive digital samples 75 with values stored in a respective one of the storage elements 68. As will be described in more detail hereafter, the PN sequence 44 is serially shifted through the storage elements 68 of the delay line 67. As shown by FIG. 2, each correlator 96 is coupled to a respective accumulator 99 that is configured to further accumulate the values output by the correlator 96 to further enhance the accuracy of the correlation results (referred to herein as "correlation values"). Note that use of the accumulators 99 is optional. If desired, anomaly decisions may be based on the correlation values directly from the correlators 96 in the same or similar way that such decisions are described hereafter as based on the values output by the accumulators 99. Furthermore, the accumulators 99 may be renormalized by rescaling periodically to avoid overflow, or reset to zero if desired at the initiation of a new testing interval, or both.

Also, note that each correlator 96 corresponds to a respective location along the optical fiber 14. In this regard, for a given correlator 96, there is a finite delay from the time that a value of the PN sequence 44 is transmitted by the optical transmitter 16 until the value is shifted into the storage element 68 that is coupled to the correlator 96. Such delay shall be referred to as the correlator's "sequence delay." Further, each point along the optical fiber 14 has a reflection delay that is based on the point's distance from the optical transmitter 16. As used herein, a point's "reflection delay" is the amount of time for a sample to travel from the optical transmitter 16 to the point, return to the detector 76, and reach the correlator 96. Generally, the further the point is from the optical transmitter 16, the greater is the point's reflection delay. Moreover, the fiber location corresponding to the correlator 96 is that location along the fiber 14 where the reflection delay is equal to the correlator's sequence delay. Thus, if a particular PN sequence value ($V_1$) transmitted by the optical transmitter 16 is reflected at the point along the fiber 14 corresponding to a given correlator 96, then the transmitted value ($V_1$) should have been delayed by the delay line 67 such that it is in the storage element 68 coupled to the correlator 96 when the reflection of the value ($V_1$) is received from the fiber 14 by such correlator 96. Therefore, at the inputs to the correlator 96, the algebraic sign of the value ($V_1$) should match the algebraic sign of the signal component reflected from the corresponding point along the fiber. Note that, for each correlator 96, the accumulator 99 that accumulates correlation values from the correlator 96 and the storage element 68 that provides PN sequence values to the correlator 96 also correspond to the same fiber location as the correlator 96. Moreover, the storage element 68 corresponding to a particular fiber location is that storage element 68 that is storing a value ($V_1$) when the reflection of such value is received from the fiber 14 by the correlator 96 that correlates such value.

In addition, each correlator 96 is implemented as a multiplier followed by an accumulator, and the correlation value in each correlator 96 is reset (e.g., re-initialized to a value of zero) at the end of each period or an integer number of periods of the PN sequence 44, after the correlation result has been accumulated by the associated accumulator 99 and transferred to the anomaly detector 110 (FIG. 2). In one exemplary embodiment, the PN sequence 44 is an M-sequence comprising a particular succession of values of +1 and −1. Accordingly, for each correlator 96, the input from a storage element 68 is either a value of +1 or a value of −1. Thus, when the input from a storage element 68 to the correlator 96 has the same algebraic sign as a reflected signal component appearing at the other input, then the correlator 96 outputs a value containing a component corresponding to these inputs that is greater than zero. In particular, if the inputs for the M-sequence value and for a reflected signal component with the corresponding delay both have positive algebraic signs, then the product of these inputs provides a contribution to the output that is greater than zero. Further, if the inputs for the M-sequence value and for a reflected signal component with the corresponding delay both have negative algebraic signs, then the product of these inputs provides a contribution to the output that also is greater than zero.

For contributions to the signal sample 75 reflected from a location on the fiber 14 with delay corresponding to the sequence delay for the correlator 96, the algebraic signs of the inputs match, and the correlation value is indicative of these signal contributions. However, for contributions to the signal sample 75 from all points on the fiber 14 where the reflection delay does not correspond to the correlator sequence delay for the correlator 96, the signs of the signal contributions from such locations are not related to the sign of the M-sequence input to the correlator 96, so that the products involving such signal contributions are approximately equally likely to be positive or negative, accumulating approximately to a zero value across the interval spanned by each period of the M-sequence. In this regard, the M-sequence is preferred in minimizing correlation spanning a full period of the sequence at all offset delay values other than zero delay, which is well known to one of ordinary skill in the art, minimizing signal contributions from all points where the reflection delay does not correspond to the sequence delay for correlator 96. Therefore, each correlator 96, as well as its associated accumulator 99 (i.e., the accumulator 99 that is coupled to the correlator 96), provides a value which is indicative of the amount of light reflected from the corresponding location along the fiber and substantially independent of the amount of light reflected from all other locations along the fiber 14.

Furthermore, the PN sequence selected for the sequence generator 42 preferably corresponds to a time interval greater than, or at least as great as, both the largest sequence delay associated with any storage element 68 of the delay line 67 and also the largest reflection delay associated with any point along the fiber 14. Such an arrangement helps to avoid ambiguity that would result from two or more storage elements 68 simultaneously storing identical consecutive PN sequence values or more than one fiber location simultaneously reflecting identical consecutive PN sequence values as the PN sequence is repeated.

As known in the art, a fiber optic line free of anomalies exhibits reflections along its length with amplitudes that are reduced in a uniform manner with increasing distance from the point where the signal is transmitted into the fiber. Furthermore, this reduction in reflected light with distance for such a fiber free from anomalies follows a predictable, nominal characteristic rate of attenuation corresponding to the parameters of the particular fiber involved. However, for a fiber with an anomaly, at the point where a line anomaly (e.g., a degraded splice) exists, more attenuation may occur as light passes through the anomaly, and in some cases more light may be reflected at this point than at other points that are free of anomalies.

Moreover, the values in the accumulators 99 can be analyzed to identify the locations of anomalies, such as degraded splices, along the fiber 14. In this regard, an anomaly detector 110 is coupled to each accumulator 99. The anomaly detector 110 receives an accumulation value from each accumulator 99 representing a sum of the values output by the associated correlator 96 (i.e., the correlator 96 that is coupled to the accumulator 99). The anomaly detector 110 compares such accumulation value to anticipated nominal values and in a preferred embodiment also to previously accumulated values that have been stored by the anomaly detector 110. If the accumulation value is consistent with the anticipated nominal values and in a preferred embodiment to previously accumulated and stored values, then the anomaly detector 110 determines that no anomaly exists at the fiber location corresponding to the associated correlator 96. However, if the accumulation value is significantly different from the anticipated nominal value or in a preferred embodiment from previously accumulated and stored values, then the anomaly detector 110 determines that an anomaly, such as a degraded splice, exists at the fiber location corresponding to the associated correlator 96.

There are various techniques that can be used to determine the values to be compared to the accumulation values from the accumulators 99. In a preferred embodiment, the system 11 performs a test, referred to hereafter as the "initialization test," of the fiber 14 by resetting accumulators 99 to zero, modulating a data signal with a particular PN sequence, transmitting the modulated data signal along the fiber 14, detecting the reflections, and correlating the detected reflections with a delayed version of the PN sequence, as is described above. After a time period ($T_1$) from the beginning of the test, the accumulation value received from each accumulator 99 at such time is stored by the anomaly detector 110. Such values define a base line that can be compared to accumulation values from a future test to detect an anomaly.

As an example, the system 11 performs another test, referred to hereafter as "runtime test," of the fiber 14 using the same PN sequence that was used for the initialization test. As in the initialization test, the system 11 resets accumulators 99 to zero, modulates a data signal with such PN sequence, transmits the modulated data signal along the fiber 14, detects reflections, and correlates the detected reflections with a delayed version of the PN sequence. After the time period ($T_1$) from the beginning of the test, the accumulation values received from the accumulators 99 at such time are compared to the previously stored accumulation values from the initialization test. In this regard, an accumulation value from a particular accumulator 99 for the runtime test is compared to the accumulation value from the same accumulator 99 for the initialization test. If the accumulation value for the runtime test is within a specified margin of the accumulation value for the initialization test, then the fiber location corresponding to the associated correlator 96 (i.e., the correlator 96 that is coupled to the particular accumulator 99 that provided the accumulation values being compared) is deemed to be free of an anomaly. However, if the accumulation value for the runtime test is not within the specified margin of the accumulation value for the initialization test, then the fiber location corresponding to the associated correlator 96 is deemed to have an anomaly. That is, if the accumulation value for the runtime test is significantly greater than or less than the accumulation value for the initialization test, then the anomaly detector 110 detects an anomaly at the fiber location corresponding to the associated correlator 96.

Notably, testing of the fiber 14, as described above, may be performed periodically or even continuously without disrupting the data communication occurring over the fiber 14. For example, after transmitting a PN sequence for a first runtime test, another PN sequence (which may be the same as or different than the PN sequence used for the first runtime test) may be immediately transmitted for performing a second runtime test immediately after the transmission of the PN sequence of the first runtime test. In such way, testing of the fiber 14 may remain continuous. Alternatively, a delay may occur between tests such that testing is periodic or at specified intervals. As described above, the OTDR tests performed on the fiber 14 are unobtrusive to the data being communicated such that the OTDR tests may be performed at any desired time, including during data communication.

The foregoing techniques for comparing accumulation values in order to detect anomalies are presented for illustrative purposes. It should be emphasized that other types of comparisons and techniques for detecting anomalies based on the data provided by the correlators 96 are possible in other embodiments.

If the anomaly detector 110 detects an anomaly, the anomaly detector 110 transmits a message indicative of the detection. The message may be a visual and/or audio message and preferably indicates the location of the anomaly (i.e., the distance of the anomaly from the optical transmitter 16). The message may be displayed to a user via an output interface 114, such as a display device or a printer, to notify a user of the detected anomaly. If desired, the message may be transmitted to a remote location via any desired communication technique (e.g., email) to notify a user at a remote location of the detected anomaly. In addition to its role particularly in indicating fiber anomalies, the output interface 114 may also be employed by the user for routine inspection at any time of the overall fiber attenuation characteristics, as determined by the values produced by the accumulators 99 and displayed by the user output interface 114.

It should be noted that some anomalies can be quickly detected without further accumulation of the correlation values from the correlators 96. As an example, if the optical fiber 14 is severed, the reflections received by the detector 76 (FIG. 7 or FIG. 8) and, hence, the values input to the correlators 96 by the sequence recovery element 72 will abruptly change in many cases. In one exemplary embodiment, as shown by FIG. 2, the anomaly detector 110 is coupled directly to the correlators 96 to enable the anomaly detector 110 to receive the correlation values output by them. The anomaly detector 110 tracks the correlation values and, for each correlator 96, compares the correlation value or values recently received from the correlator 96 to values previously received from the correlator 96 or with values previously received from the associated accumulator 99 that is coupled to the correlator 96. If the fiber 14 is abruptly severed (e.g., cut by a backhoe or other digging apparatus), then the pattern of the values from the correlator 96 will abruptly change. The anomaly detector 110 is configured to detect changes in the pattern of correlation values from the correlators 96 and to notify a user when such a change is detected.

As an example, the anomaly detector 110 may transmit a message indicative of such detection to the output interface 114. If desired, the message may be transmitted to a remote location via any desired communication technique (e.g., email) to notify a user at a remote location of the detected anomaly. Note that the message may be a visual and/or audio message. As an example, a light emitting diode (LED) or other light source may be activated in order to indicate an alarm condition to a user. Alternatively, a verbal message or other sound may be emitted by a speaker. Other techniques for informing a user of an anomaly are possible in other embodiments.

In one exemplary embodiment, when the anomaly detector 110 reports an anomaly, the detector 110 provides a value indicative of the anomaly's location along the optical fiber 14. In this regard, a distance table 115 (FIG. 2) is predefined and stored in memory 116. The distance table 115 has an identifier for each correlator 96 and maps each identifier to a distance value. Such distance value indicates the distance (relative to the transmitter 16) of the fiber location that corresponds to the identified correlator 96. When the anomaly detector 110 detects an anomaly based on the output of a correlator 96 (e.g., based on the value in the accumulator 99 that accumulates the correlator's output), the anomaly detector 110 retrieves the distance value mapped to this correlator 96 and provides the distance value when reporting the anomaly. Such distance value indicates the reported anomaly's distance from the transmitter 16. Thus, based on the message provided by the anomaly detector 110, the user is aware of not just the existence of the anomaly but also of the anomaly's approximate location along the fiber 14. Such information can be used to help a technician to quickly find and repair the anomaly.

Note that, in one exemplary embodiment, the components of the OTDR system 15 are implemented in hardware. However, in other embodiments, it is possible for various components to be implemented in hardware, software, firmware, or combinations thereof.

An exemplary use and operation of the OTDR system 15 will now be described below with particular reference to FIG. 9.

For illustrative purposes assume that a degraded splice exists at a point along the optical fiber 14 such that a relatively high portion of an optical signal propagating along the fiber 14 is reflected at this point. Further assume that there are no other line anomalies present on the fiber 14. One of the correlators 96, referred to hereafter in the present example as the "Anomaly Correlator," corresponds to the location of the degraded splice.

Figure 9:
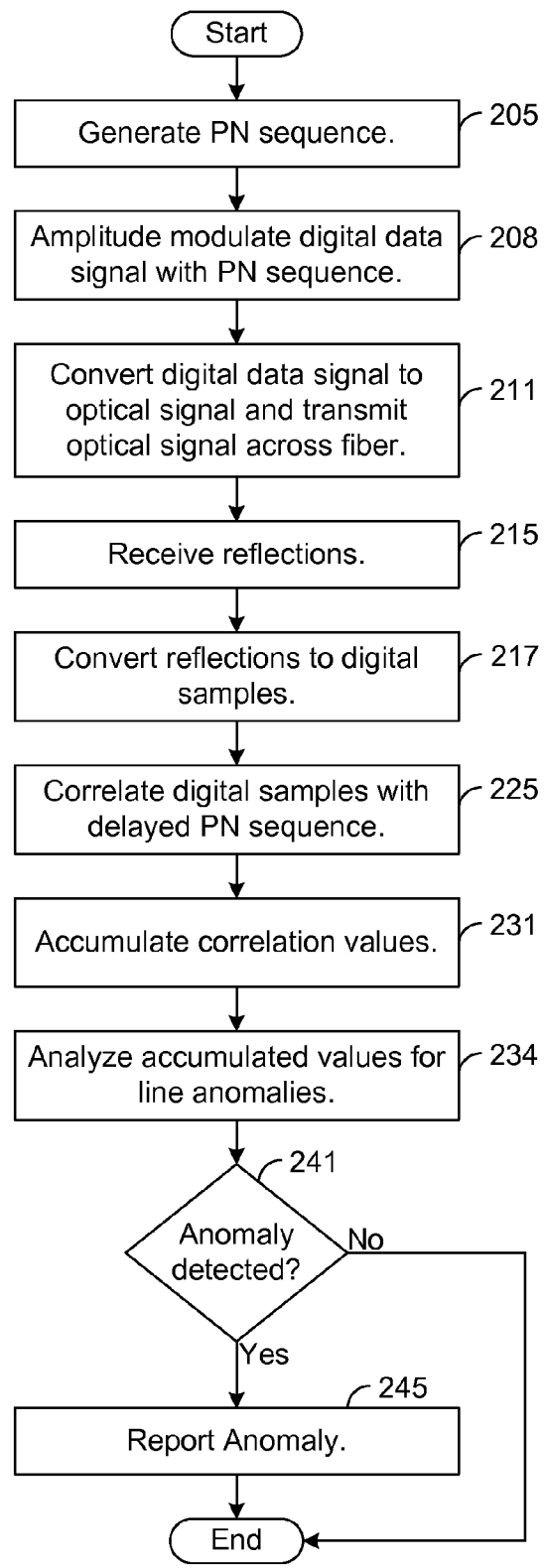
FIG. 9 is a flow chart illustrating an exemplary method of detecting anomalies along an optical fiber.

As shown by block 205 of FIG. 9, the sequence generator 42 generates a PN sequence 44. For illustrative purposes, assume that this PN sequence 44 is an M-sequence, and the amplitude modulation element 31 amplitude modulates a digital data signal 24 with this M-sequence, as shown by block 208 of FIG. 9. As described above, the amplitude of the M-sequence used to modulate the digital data signal 24 is kept sufficiently small to prevent the modulation from causing errors at the receiver 12. In one exemplary embodiment, the modulation causes less than about a 10% change to the amplitude of the digital data signal 24.

The optical transmitter 16 converts the modulated digital data signal 33 to an optical signal 22 and transmits the optical signal 22 across the optical fiber 14, as shown by block 211 of FIG. 9. As the optical signal 22 propagates along the fiber 14, portions of the signal 22 are reflected back toward the transmitter 16. Indeed, at the degraded splice, a larger portion of the signal 22 is reflected relative to other approximately adjacent locations, which are free of anomalies in the instant example.

The reflected light is received by the sequence recovery element 72, as shown by block 215 of FIG. 9, and the sequence recovery element 72 converts the reflections into digital samples 75, as shown by block 217. The correlators 96 correlate each digital sample 75 from the sequence recovery element 72 with the values stored in the delay line 67, as shown by block 225 of FIG. 9, and the correlation values output by the correlators 96 are respectively summed by the accumulators 99, as shown by block 231.

As described above, one of the correlators 96, the Anomaly Correlator 96, corresponds to the location of the degraded splice from which a relatively high portion of light is reflected. For this correlator 96, the sign of the value from the delay line 67 matches the sign of the relatively high contribution to the value from the sequence recovery element 72 for each correlation. Thus, the Anomaly Correlator 96 outputs a relatively high value with a positive algebraic sign for each correlation, and the value in the accumulator 99 receiving the correlation values provided by the Anomaly Correlator 96 continues to increase. In this regard, the value in such accumulator 99 is incremented by the amount of the Anomaly Correlator 96 output for each correlation.

For each of the remaining correlators 96, the correlation output values correspond to the nominal anticipated results. Accordingly, after a period of time, the value in the accumulator 99 that receives the correlation values of the Anomaly Correlator 96 accumulates to a relatively large number, exceeding the nominal anticipated value by some margin. However, the values in the other accumulators 99 remain close to the nominal anticipated results.

After the system 15 has run for a period of time, the anomaly detector 110 analyzes the values in the accumulators 99 in an effort to identify anomalies along the optical fiber 14, as shown by block 234 of FIG. 9. In this regard, the anomaly detector 110 compares each accumulation value to a nominal anticipated value and in a preferred embodiment also to previously stored values, if such previously stored values are available. The value in the accumulator 99 that is coupled to the Anomaly Correlator 96 exceeds the nominal anticipated value by some specified margin, and the anomaly detector 110 determines that there is an anomaly at the location corresponding to this correlator 96 based on the comparison. Thus, the anomaly detector 110 makes a "yes" determination in block 241 of FIG. 9, and reports the location of the anomaly, as shown by block 245. The remainder of the accumulation values correspond to the nominal anticipated values in the current example, and the anomaly detector 110, therefore, makes no more anomaly detections.

As previously indicated above, some conventional OTDR systems operate by transmitting a pulse along a fiber and then silencing the transmitter for a significant period of time in order to measure the reflections. Unlike such systems, the OTDR system 15 can continuously transmit a PN sequence 44 across a fiber 14 such that there is more energy resulting in a better signal-to-noise ratio for the reflections than for conventional pulse OTDR systems transmitting similar peak signal levels. In addition, the trade-off between resolution and range described above for some conventional systems can be mitigated by the OTDR system 15. In this regard, to test a longer fiber 14 for anomalies, the length of the delay line 67 can be increased such that resolution is not compromised for the longer reach. If desired, additional correlators 96 and accumulators 99 may be incorporated corresponding to the longer delay line 67, or in another exemplary embodiment for hardware simplification, the existing correlators 96 may periodically be multiplexed at intervals corresponding to an exact integral multiple of the PN-sequence period by changing their connections to different groups of storage elements 68 in delay line 67 and to additional groups of accumulators 99. A similar multiplexing method could be used to reduce the hardware complexity of other embodiments also; however, it is recognized that the time required to obtain equivalently accurate results will be extended by a ratio similar to the reduction ratio in the number of correlators employed. It will be apparent to one skilled in the art upon reading this disclosure that various other hardware multiplexing schemes might be used to accomplish other compromises between hardware complexity and the time required to obtain measurements of a given accuracy.

Figure 10:
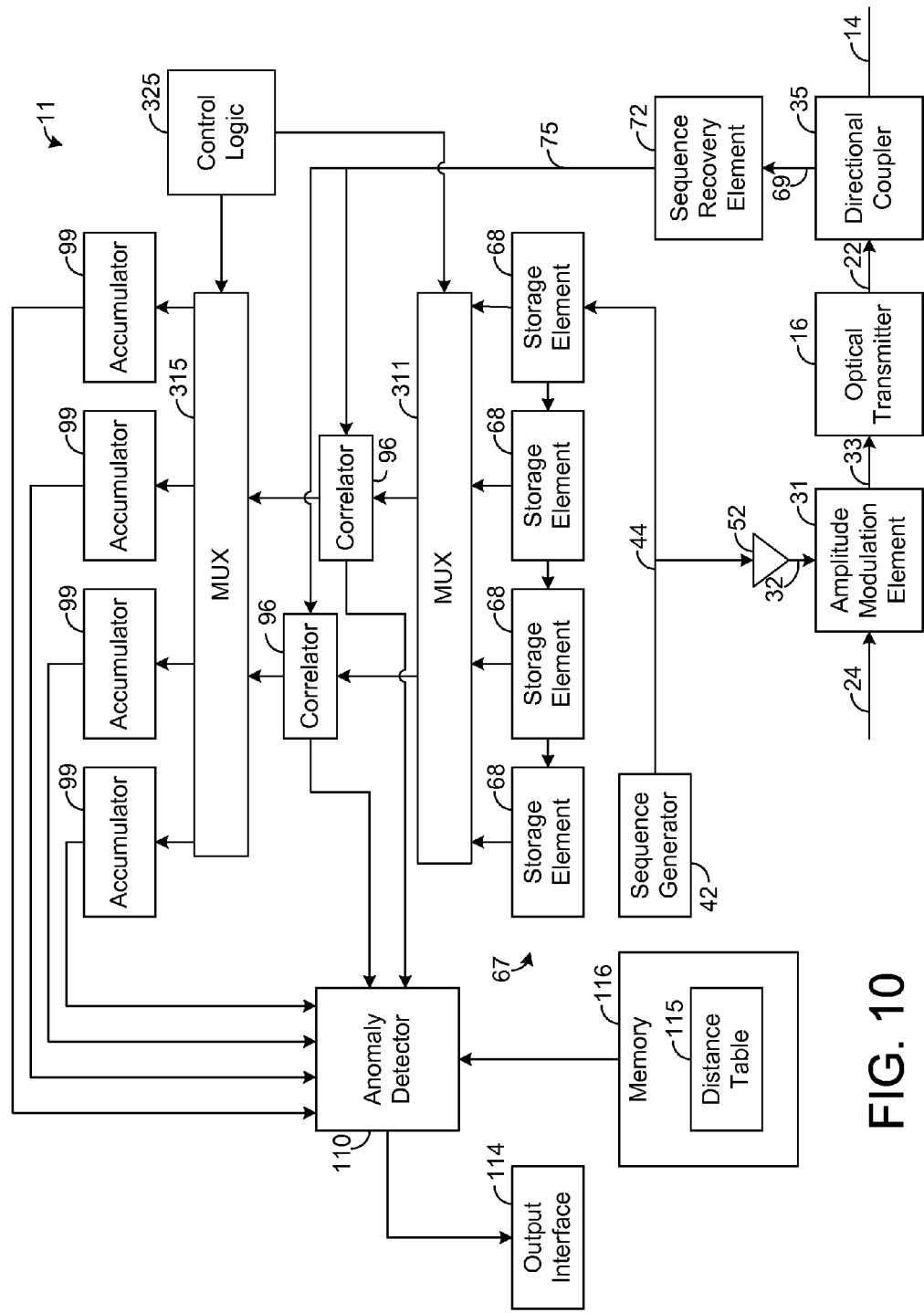
FIG. 10 is a block diagram illustrating an exemplary embodiment of an optical transmission system, such as is depicted by FIG. 1.

FIG. 10 depicts another exemplary embodiment of the transmission system 11 in which the correlators 96 are multiplexed to reduce the amount of correlation circuitry that is required to provide a desired resolution and reach. In one exemplary embodiment, the system 11 shown by FIG. 10 has two correlators 96 that are multiplexed to provide the same resolution and reach as four correlators 96, such as is depicted by FIG. 2, that are not multiplexed.

As shown by FIG. 10, the storage elements 68 are coupled to a multiplexer 311 that receives PN sequence values stored in the storage elements 68 and provides PN sequence values from selected storage elements 68 to the correlators 96. In addition, the correlators 96 are coupled to a multiplexer 315 that receives correlation values from the correlators 96 and provides the correlation values to selected accumulators 99. Also, the multiplexers 311, 315 are coupled to and operate under the direction and control of control logic 325, which may be implemented in hardware, software, firmware or any combination thereof. In one exemplary embodiment, the control logic 325 is implemented in hardware, but other configurations of the control logic 325 are possible in other embodiments.

The control logic 325 controls the multiplexers 311, 315 such that the correlators 96 selectively correlate PN sequence values from various storage elements 68 as may be desired. Further, the multiplexer 315 is controlled such that the correlation values derived from PN sequence values transmitted by the same storage element 68 are received by the same accumulator 99. In this regard, for each accumulator 99, the accumulator 99 receives correlation values derived from a single respective storage element 68 that corresponds to the same fiber location as the accumulator 99. Thus, the accumulation value within the accumulator 99 is indicative of whether an anomaly exists at the corresponding fiber location, as described above for the embodiment shown by FIG. 2, but a given correlator 96 is multiplexed to feed more than one accumulator 99 at different times thereby reducing the amount of correlation circuitry needed in the system 11. In particular, an n number of accumulators 99 and storage elements 68 can be serviced by less than n number of correlators 96, wherein n is any positive integer.

As an example, the multiplexer 311 may be controlled such that the input to one of the correlators 96 is switched from the output of one of the storage elements 68, referred to hereafter as the "first storage element," to the output of another storage element 68, referred to hereafter as the "second storage element." That is, the storage element output used to feed the correlator 96 is switched from the first storage element 68 to the second storage element 68. At such switch, the multiplexer 315 is also controlled such that the output of such correlator 96 is switched from the accumulator 99 that receives correlation values derived from the sequence values of the first storage element 68 to the accumulator 99 that receives correlation values derived from the sequence values of the second storage element 68.

Further, by controlling the timing of the switch such that it precisely occurs at the end of a period of the PN sequence 44 and, hence, at the time of reset of the correlator 96, there is no need to update or otherwise account for the value in the correlator 96 at the time of the switch. In this regard, at the time of the switch, the value in the correlator 96 is reset to a value of zero. Therefore, the correlations performed by the correlator 96 prior to the switch do not affect the correlations performed by the correlator 96 after the switch. Moreover, by switching the correlator 96 at intervals corresponding to an exact integral multiple of the PN-sequence period such that each switch occurs at the time of reset of the correlator 96, the configuration can be simplified since it is unnecessary to update or otherwise account for the correlation value in the correlator 96 at the time of the switch.

Figure 11:
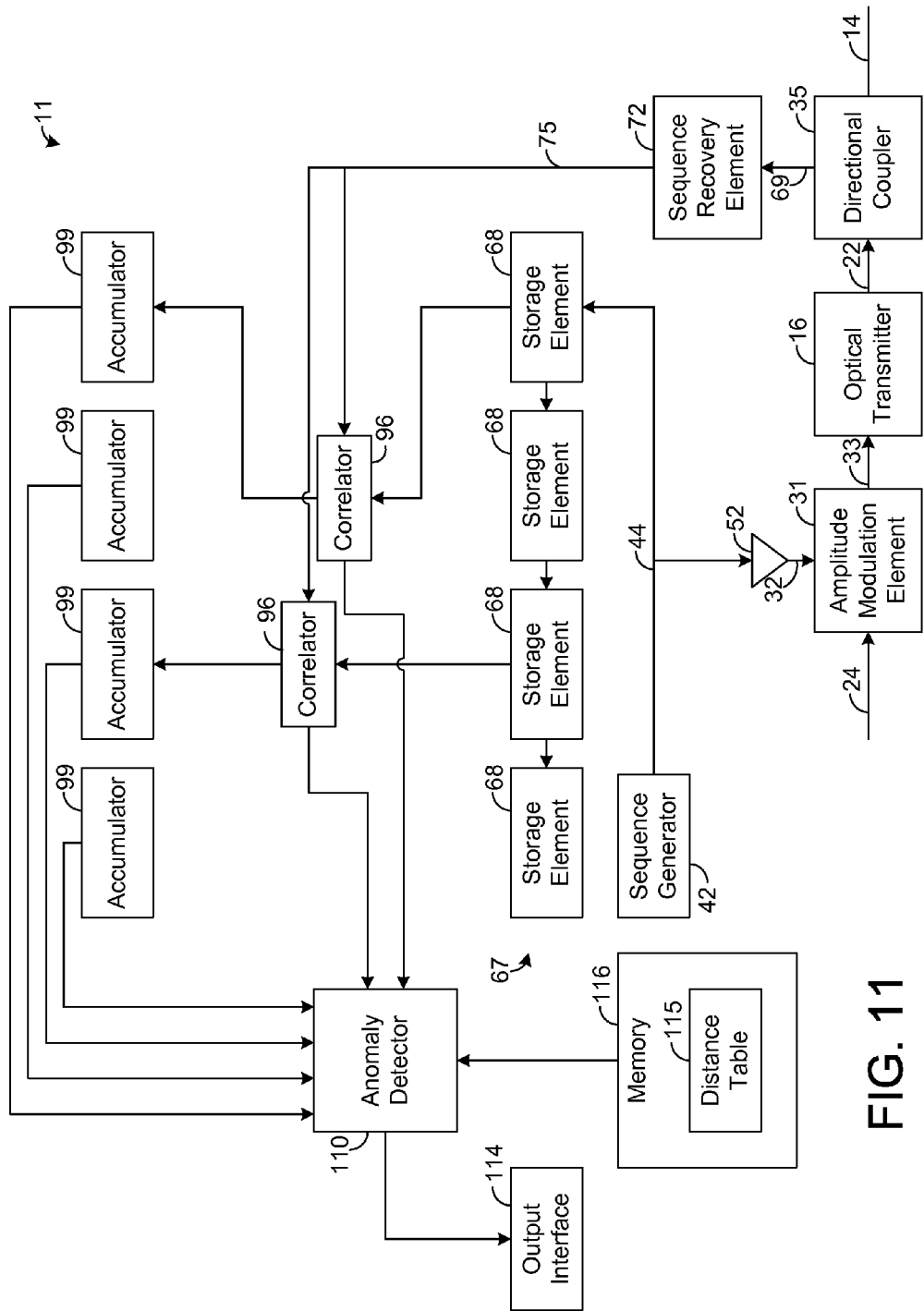
FIG. 11 shows the exemplary transmission system of FIG. 10 prior to a correlator assignment change with multiplexers and control logic removed to better illustrate the flow of data within the system.

To better illustrate the foregoing, an exemplary operation of the system 11 shown by FIG. 10 will be described below. For illustrative purposes, assume that the control logic 325 initially controls the multiplexer 311 such that each correlator 96 receives sequence values from a single respective storage element 68. The control logic 325 also initially controls the multiplexer 315 such that the correlation values from each correlator 96 are received by a single respective accumulator 99. FIG. 11 shows the initial flow of data with the multiplexers 311, 315 and control logic 325 removed for illustrative purposes. The system 11 is allowed to run for x periods of the PN sequence 44, in which x is any positive integer. In such example, two accumulators 99 are updating their respective accumulation values. The other two accumulators 99 do not receive correlation values and are idle, as shown by FIG. 11.

At the end of x periods of the PN sequence 44, the correlators 96 are reset, as they are so controlled at the end of each period or an integer number of periods of the PN sequence, and the control logic 325 also performs a correlator assignment change. In this regard, the control logic 325 controls the multiplexer 311 such that each correlator 96 begins to receive PN sequence values from a different storage element 68 relative to the storage element 68 from which the correlator 96 received PN sequence values in the time period before the assignment change. The control logic 325 also controls the multiplexer 315 such that the output of each correlator 96 is transmitted to a different accumulator 99 relative to the accumulator 99 that received the correlator's output in the time period before the switch. That is, the correlator 96 begins providing correlation for a new location along the fiber 14 (i.e., the fiber location corresponding (1) to the storage element 68 that is providing the sequence values being correlated by the correlator 96 after the assignment change and (2) to the accumulator 99 that accumulates correlation values derived from such storage element 68).

Figure 12:
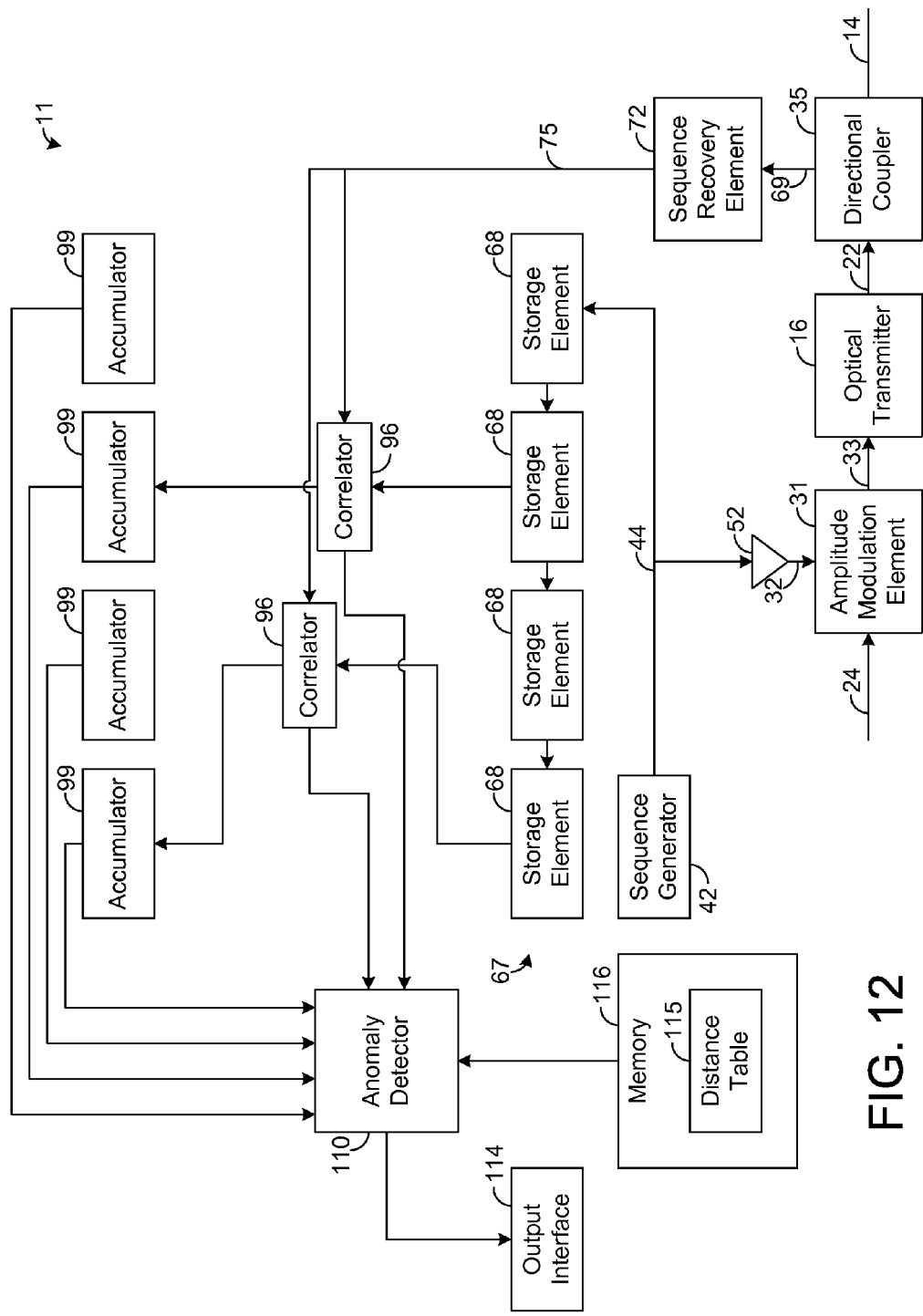
FIG. 12 shows the exemplary transmission system of FIG. 10 subsequent to the correlator assignment change with multiplexers and control logic removed to better illustrate the flow of data within the system.

FIG. 12 shows the flow of data after the correlator assignment change with the multiplexers 311, 315 removed for illustrative purposes. As shown by FIG. 12, the two accumulators 99 that were idle prior to the assignment change, as shown by FIG. 11, are now accumulating correlation values. In addition, the two accumulators 99 that were accumulating prior to the assignment change are now idle. The system 11 is allowed to run for another x periods (or some other integer multiple of the PN sequence period), and the control logic 325 performs yet another correlator assignment change such that the flow of data appears as shown by FIG. 11. In such way, two correlators 96 can be used to service four accumulators 99 corresponding to four locations along the fiber 14. In other embodiments, the same correlator 96 can be similarly used to service any number of accumulators 99, and if desired, different correlators 96 can be used to service the same accumulator 99 at different times. Further, it is unnecessary for the assignment of any two correlators 96 to be changed at the same time or the same rate. Indeed, the change of any correlator assignment for one correlator 96 may be independent of the assignment changes of any other correlator 96. Further, it would be apparent to one of ordinary skill in the art upon reading this disclosure that variations to the exemplary assignment change algorithm described herein are possible.

Notably, the OTDR system 15 allows for the testing of the fiber 14 for anomalies while simultaneously communicating payload data along the fiber 14. In this regard, the modulation of the digital data signal 24 with the PN sequence 44 is kept small enough such that the receiver 12 is able to recover the payload data despite the small amount of noise introduced by such modulation. Thus, simultaneous anomaly testing and data communication is achieved without significantly impairing the communication performance of the system 10.

Further, various embodiments described above include an anomaly detector 110 to automatically detect a line anomaly, such as a degraded splice or damaged section of the fiber 14, based on the accumulation values from the accumulators 99 or correlation values directly from the correlators 96. However, the use of such an anomaly detector 110 is unnecessary. As an example, the system 11 may be configured to provide the accumulation values or correlation values to the output interface 114, which displays such values to a user. The user may then analyze the displayed values and/or compare the values to accumulation or correlation values from a previous test of the fiber 14 to determine whether a line anomaly exists and, if so, to identify the location of the anomaly. Such manual detection of an anomaly and identification of its location can also be performed in embodiments that employ an anomaly detector 110, if desired.

In addition, it is also possible for the anomaly detector 110, if employed, to be located remotely from other components of the system 11, such as the accumulators 99 and correlators 96. As an example, the accumulation values or correlation values may be transmitted to the anomaly detector 110 via a network or may be downloaded to a computer readable-medium, which is transported to a computer or other type of apparatus that analyzes the accumulation values or correlation values for indications of line anomalies. Various other modifications and changes would be apparent to one of ordinary skill upon reading this disclosure.

Now, therefore, the following is claimed:

1. An optical transmission system, comprising: a sequence generator configured to generate a digital data sequence; an amplitude modulation element configured to receive a digital data signal comprising payload data, the amplitude modulation element configured to amplitude modulate the digital data signal with the digital data sequence thereby providing an amplitude modulated signal;

an optical transmitter coupled to an optical fiber, the optical transmitter configured to convert the amplitude modulated signal to an optical signal and to transmit the optical signal across the optical fiber;

a sequence recovery element configured to receive reflections of the optical signal from the optical fiber and to convert the reflections to digital samples; and a plurality of correlators configured to correlate the digital samples with the digital data sequence thereby providing a plurality of correlation values, wherein each of the correlators corresponds to a respective location along the optical fiber, and wherein each of the correlators is configured to correlate one of the digital samples with a respective value of the digital data sequence thereby providing a correlation value indicating whether an anomaly exists at the corresponding location along the optical fiber.

2. The system of claim 1, further comprising an anomaly detector configured to automatically detect an anomaly of the optical fiber based on the correlation values.

3. The system of claim 1, further comprising a plurality of accumulators configured to accumulate the correlation values thereby providing a plurality of accumulation values.

4. The system of claim 3, wherein the plurality of correlators include at least a first correlator and a second correlator, wherein the first correlator is configured to feed correlation values to each of the plurality of accumulators.

5. The system of claim 1, wherein the digital data sequence is a pseudo noise (PN) sequence.

6. The system of claim 1, wherein the digital data sequence is an M-sequence.

7. The system of claim 1, further comprising a delay line configured to delay the digital data sequence, wherein the delay line is configured to transmit the digital data sequence to the plurality of correlators.

8. The system of claim 7, wherein the delay line comprises a plurality of storage elements, each of the storage elements configured to transmit a respective value of the digital data sequence to a respective one of the correlators.

9. The system of claim 1, wherein amplitude modulation by the amplitude modulation element affects an amplitude of each bit of the digital data signal by less than 10%.

10. The system of claim 1, wherein the digital data sequence has a period, and wherein each of the correlators is configured to correlate the digital samples with delayed values of the digital data sequence for an interval equal to an integer multiple of the period.

11. The system of claim 1, wherein the amplitude modulation element is configured to amplitude modulate a plurality of bits of the digital data signal with a single value of the digital data sequence.

12. The system of claim 1, wherein the sequence recovery element comprises:

a detector configured to detect the reflections of the optical signal and to provide a signal based on the detected reflections;

a bandpass filter configured to filter the signal provided by the detector thereby providing a filtered signal; and an analog-to-digital converter configured to receive the filtered signal.

13. The system of claim 1, wherein one of the correlators is configured to receive one of the digital samples representing a sum of reflected signal components, including Rayleigh backscatter returns, that have been reflected at different points along the optical fiber, and wherein the one correlator is configured to correlate the one digital sample with a value of the digital data sequence thereby providing one of the correlation values.

14. The system of claim 13, further comprising an accumulator coupled to the one correlator, wherein the plurality of correlation values include at least a first plurality of correlation values and a second plurality of correlation values, wherein the one correlator is configured to multiply and accumulate the digital samples with values of the digital data sequence thereby providing the first plurality of correlation values, and wherein the accumulator is configured to accumulate the first plurality of correlation values provided by the one correlator.

15. The system of claim 1, wherein the sequence recovery element comprises:

a detector configured to receive the reflections and to provide an analog signal based on the reflections;

a summer configured to subtract a direct current (DC) offset signal from the analog signal thereby removing a DC component of the analog signal; and an analog signal converter configured to convert the analog into the digital samples.

16. An optical transmission system, comprising: a sequence generator configured to generate a digital data sequence; an amplitude modulation element configured to receive a digital data signal comprising payload data, the amplitude modulation element configured to amplitude modulate the digital data signal with the digital data sequence thereby providing an amplitude modulated signal; an optical transmitter coupled to an optical fiber, the optical transmitter configured to convert the amplitude modulated signal to an optical signal and to transmit the optical signal across the optical fiber;

a sequence recovery element configured to receive reflections of the optical signal from the optical fiber and to convert the reflections to digital samples; and a plurality of correlators configured to correlate the digital samples with the digital data sequence thereby providing a plurality of correlation values, wherein the plurality of correlators includes at least a first correlator and a second correlator; a first storage element corresponding to a first location along the optical fiber and configured to store a respective value of the digital data sequence;

a second storage element corresponding to a second location along the optical fiber and configured to store a respective value of the digital data sequence; and a multiplexer coupled between the first correlator and the first and second storage elements, the multiplexer configured to multiplex between output of the first storage element and output of the second storage element such that the first correlator receives at least one value of the digital data sequence from the first storage element and at least one value of the digital data sequence from the second storage element.

17. The system of claim 16, wherein the system comprises a delay line comprising the first and second storage elements, wherein the delay line is configured to delay the digital data sequence by shifting the digital data sequence, and wherein the system further comprises control logic configured to control the multiplexer such that an output of the multiplexer provided to the first correlator is switched from the output of the first storage element to the output of the second storage element at an end of a period of the digital data sequence.

18. An optical transmission method, comprising the steps of:
generating a digital data sequence;
receiving a digital data signal comprising payload data;
amplitude modulating the digital data signal with the digital data sequence thereby providing an amplitude modulated signal;
delaying the digital data sequence;
converting the amplitude modulated signal to an optical signal;
transmitting the optical signal across an optical fiber;
receiving reflections of the optical signal from the optical fiber;
converting the reflections to digital samples;
correlating, via a plurality of correlators, the digital samples with the delayed digital data sequence thereby providing a plurality of correlation values, wherein each of the correlators corresponds to a respective location along the optical fiber, and wherein the correlating step comprises the step of correlating, at each of the correlators, one of the digital samples with a respective value of the digital data sequence thereby providing a correlation value indicating whether an anomaly exists at the corresponding location along the optical fiber; and
providing an indication whether an anomaly exists along the fiber based on the correlation values.

19. The method of claim 18, further comprising the step of accumulating the correlation values thereby providing a plurality of accumulation values, wherein the providing step is based on the accumulation values.

20. The method of claim 18, wherein the digital data sequence is a pseudo noise (PN) sequence.

21. The method of claim 18, wherein the digital data sequence is an M-sequence.

22. The method of claim 18, further comprising the step of automatically detecting an anomaly of the optical fiber based on the correlation values.

23. The method of claim 22, further comprising the step of automatically identifying a location of the detected anomaly based on the correlation values.

24. The method of claim 18, wherein the one digital sample represents a sum of reflected signal components, including Rayleigh backscatter returns, that have been reflected at different points along the optical fiber.

25. The method of claim 24, wherein the plurality of correlation values include a first plurality of correlation values and a second plurality of correlation values, wherein the correlating step comprises the steps of multiplying and accumulating at one of the correlators the digital samples with values of the digital data sequence thereby providing the first plurality of correlation values, and wherein the method further comprises the steps of:
transmitting the first plurality of correlation values from the one correlator to an accumulator; and
accumulating the first plurality of the correlation values via the accumulator.

26. The method of claim 18, wherein the converting step comprises the steps of:
providing an analog signal based on the reflections;
subtracting a direct current (DC) offset signal from the analog signal thereby removing a DC component of the analog signal; and
converting the analog signal into the digital samples.

27. An optical transmission method, comprising the steps of:
generating a digital data sequence;
receiving a digital data signal comprising payload data;
amplitude modulating the digital data signal with the digital data sequence thereby providing an amplitude modulated signal;
delaying the digital data sequence;
converting the amplitude modulated signal to an optical signal;
transmitting the optical signal across an optical fiber;
receiving reflections of the optical signal from the optical fiber;
converting the reflections to digital samples;
correlating the digital samples with the delayed digital data sequence thereby providing a plurality of correlation values;
and providing an indication whether an anomaly exists along the fiber based on the correlation values; receiving a first value of the digital data sequence from a storage element corresponding to a first location along the optical fiber;
receiving a second value of the digital data sequence from a storage element corresponding to a second location along the optical fiber; and
multiplexing between the first and second received values to provide a multiplexed output, wherein the correlating is based on the multiplexed output.

* * * * *